No. 751,898. PATENTED FEB. 9, 1904.
R. BODLAENDER.
MORTAR MIXER.
APPLICATION FILED MAY 28, 1903.
NO MODEL.
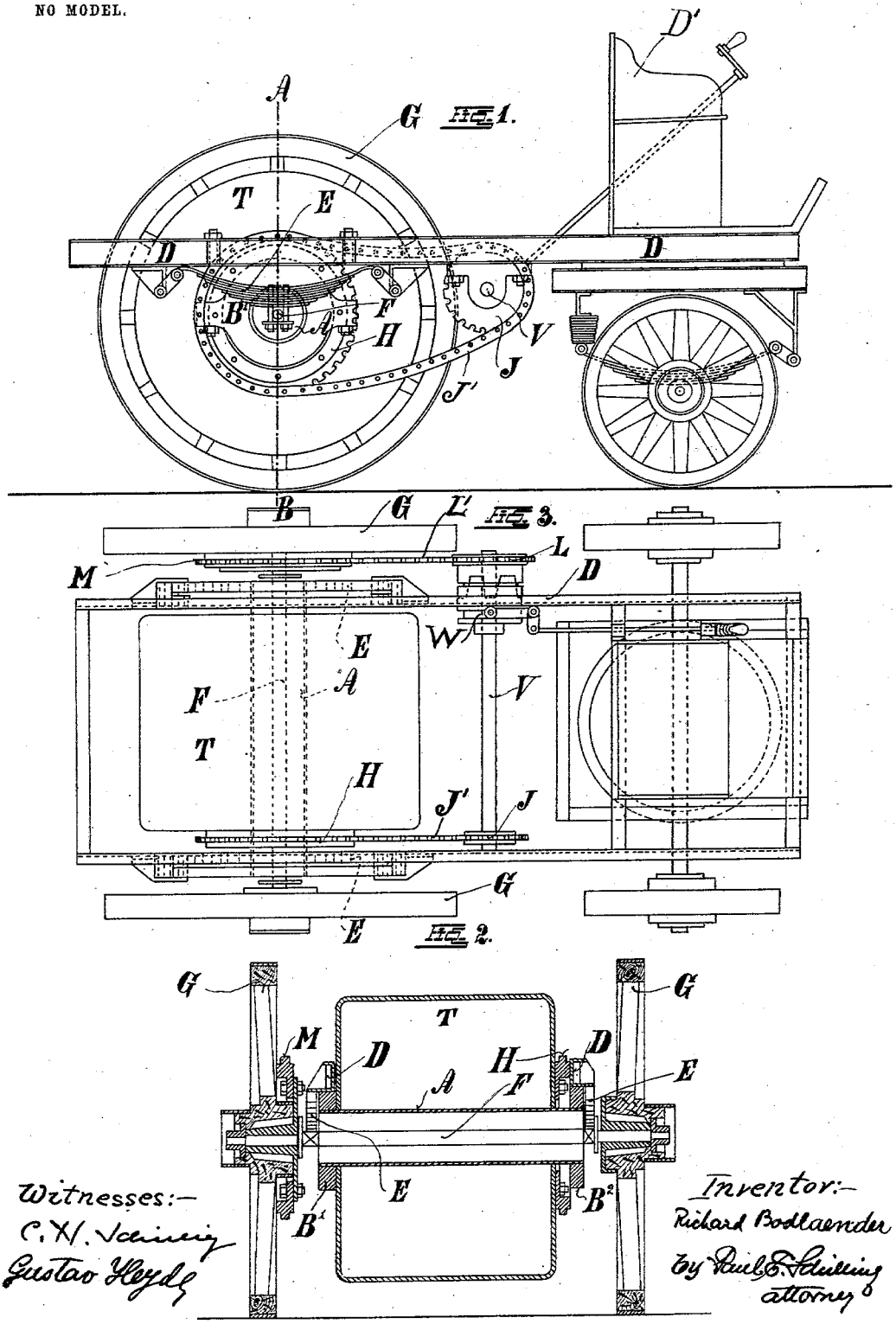
Witnesses:-
C. H. _____
Gustav Heyde
Inventor:-
Richard Bodlaender
By Paul _____
attorney No. 751,898. Patented February 9, 1904.

UNITED STATES PATENT OFFICE.

RICHARD BODLAENDER, OF BRESLAU, GERMANY.

MORTAR-MIXER.

SPECIFICATION forming part of Letters Patent No. 751,898, dated February 9, 1904.

Application filed May 28, 1903. Serial No. 159,219. (No model.)

*To all whom it may concern:*

Be it known that I, RICHARD BODLAENDER, a subject of the Emperor of Germany, residing at Breslau, Germany, have invented certain new and useful Improvements in Mortar-Mixers, of which the following is a specification.

The present invention has reference to improvements in mortar-mixers, and relates more especially to conveyances with revolving mixing-receptacle actuated during motion of the conveyance, and thereby automatically mixing the contents.

My invention has for its object to provide a mixing-drum yieldingly supported upon an axle, whereby vibration is absorbed.

Another object lies in providing a gearing for the purpose of reducing the ratio of rotation of the drum with reference to the truck-wheels.

In order to make my invention more readily understood, I have illustrated it on the accompanying sheet of drawings, Figure 1 of which represents a side elevation of the new mortar-truck with the one hind wheel removed. Fig. 2 is a sectional elevation on line A B of Fig. 1, and Fig. 3 a plan view.

The mixing-drum T is provided with a central hollow axle A, journaled in bearings B, B², preferably of the ball type, which are suitably secured by bolts or other means to the channel-irons D. The latter in turn are carried by springs E, which rest upon the hind wheel-axle F. One of the truck-wheels G is provided with a chain-wheel M and is connected by a chain L with the chain-wheel L upon axle V. Upon the latter is also arranged a chain-wheel J, which is connected by means of a chain J' to a chain-wheel H, rigidly secured to the mixing-drum. The gearing is such that the mixing-drum revolves considerably more slowly than the hind truck-wheels, a good ratio being about one to three. A coupling mechanism W on axle V, adapted to be actuated from the driver-seat D' by suitable mechanism, throws the mixing-drum into or out of operation.

The spring suspension of the mixing-drum brings about a more thorough mixing of the mortar than in the case of the rigidly-journaled mixing-drums. It lightens considerably the work of the draft-animals and reduces wear and tear. It further prevents settling of the heavy particles and keeps them better suspended in the water, while in the old constructions the heavier particles, as sand, are apt to settle when after thorough mixing the drum is stopped from revolving before the destination is reached.

What I claim is—

1. In a mortar-mixer, the combination with the hollow axle having a drum supported thereon, and journal-bearings secured thereto, of resilient means for yieldingly supporting the bearings, a solid axle supported upon truck-wheels and passing through the hollow axle for supporting the resilient means, and a reducing-gearing interposed between the drum and the truck-wheels, substantially as described.

2. In a mortar-mixer, a frame, a revolving mixing-drum, means for yieldingly suspending said drum from the frame, comprising a central hollow axle, bearings secured to the frame for supporting the axle, a solid axle supported on truck-wheels and passing through the hollow axle, springs secured to the truck-frame and resting upon the said solid axle, a gearing connecting one of the truck-wheels with the mixing-drum, and means connected to the gearing for throwing the drum in and out of operation, substantially as described.

3. In a mortar-mixer, a truck-frame, a revolving drum, a hollow axle passing through the drum, a solid axle passing through the hollow axle, truck-wheels revolving on the ends of the solid axle, means for yieldingly securing said drum to the truck-frame so that the solid axle normally lies concentrically to the hollow axle, and means for revolving said drum at a different speed from the truck-wheels, substantially as described.

4. In a mortar-mixer, a truck-frame, a revolving mixing-drum, a hollow axle passing through said drum, bearings supporting said hollow axle and secured to the frame, a solid axle passing through the hollow axle, truck-wheels revolving on the ends of said solid axle, springs yieldingly supporting the frame on the said solid axle, a sprocket-wheel secured to one of the truck-wheels, a sprocket-wheel secured to the mixing-drum, and means for connecting the sprocket-wheels for revolving the said drum at a ratio less than the revolution of the truck-wheels, substantially as described.

In testimony that I claim the foregoing as my invention I have signed my name in presence of two subscribing witnesses.

RICHARD BODLAENDER. [L. S.]

Witnesses:
E. HÄMBACHER,
WALTER HAUSING.